United States Patent [19]

Leonardi

[11] Patent Number: 4,777,412
[45] Date of Patent: Oct. 11, 1988

[54] GULLWING DISTORTION CORRECTION CIRCUIT

[75] Inventor: Giovanni M. Leonardi, Zurich, Switzerland

[73] Assignee: RCA Licensing Corporation, Princeton, N.J.

[21] Appl. No.: 102,514

[22] Filed: Sep. 29, 1987

[30] Foreign Application Priority Data

Mar. 23, 1987 [GB] United Kingdom ............... 8706822

[51] Int. Cl.[4] .......................................... H01J 29/56
[52] U.S. Cl. ..................................... 315/371; 315/370
[58] Field of Search ................................ 315/370, 371

[56] References Cited

U.S. PATENT DOCUMENTS

| | | |
|---|---|---|
| 4,642,530 | 2/1987 | Rodriguez-Cavazos ........... 315/371 |
| 4,668,897 | 5/1987 | Haferl ................................. 315/371 |
| 4,682,085 | 7/1987 | Haferl et al. ....................... 315/371 |
| 4,687,972 | 8/1987 | Haferl ................................. 315/371 |

FOREIGN PATENT DOCUMENTS 2010814 9/1971 Fed. Rep. of Germany .
1554404 10/1979 United Kingdom .

OTHER PUBLICATIONS

Telefunken Sprecher, No. 68, Feb. 1976, pp. 3-33.

Primary Examiner—Theodore M. Blum
Assistant Examiner—David Cain
Attorney, Agent, or Firm—Eugene M. Whitacre; Joseph J. Laks; Sammy S. Henig

[57] ABSTRACT

A gullwing distortion correction signal and a north-south pincushion distortion correction signal are generated and then summed to form a sum signal. The sum signal is coupled to a primary winding of a transformer. A secondary winding of the transformer is coupled in a current path of a vertical rate deflection current for modulating the deflection current in a manner that reduces the gullwing and north-south pincushion distortions. The secondary winding is included in a resonant circuit that is tuned to resonate at the horizontal frequency.

24 Claims, 4 Drawing Sheets

PINCUSHION DISTORTION OF RASTER

GULLWING DISTORTION CORRECTION CIRCUIT

This invention relates to gullwing distortion corrected deflection circuits.

New, flatter faceplate picture tubes, such as the RCA Corporation square-planar picture tubes have aspherical faceplate curvatures.

In one form of flatter faceplate picture tube, as typified by the RCA 110° COTY-SP, square-planar, 27V, color television picture tube, A68ACC10X, the formula for the tube faceplate sagittal height, z, in millimeters, with reference to the center of the faceplate is given by:

$$Z = A_1 X^2 + A_2 X^4 + A_3 Y^2 + A_4 X^2 Y^2 + A_5 X^4 Y^2 + A_6 Y^4 + A_7 X^2 Y^4 + A_8 X^4 Y^4,$$

where X and Y are the distance coordinates, in millimeters, from the faceplate center along the major and minor axes, respectively, and where:

$A_1 = -0.236424229 \times 10^{-4}$
$A_2 = -0.363538575 \times 10^{-8}$
$A_3 = -0.422441063 \times 10^{-3}$
$A_4 = -0.213537355 \times 10^{-8}$
$A_5 = +0.883912220 \times 10^{-13}$
$A_6 = -0.100020398 \times 10^{-9}$
$A_6 = -0.100020398 \times 10^{-9}$
$A_7 = +0.117915353 \times 10^{-14}$
$A_8 = +0.527722295 \times 10^{-21}$ The picture tube faceplate defined by this formula has a relativly shallow curvature near the center of the faceplate, which increases near the edges along paths parallel to both the major and minor axes of the tube. The overall result is a faceplate of relatively flat appearance and with planar edges, namely, with points along the top, bottom, right and left edges located substantially in a common plane.

Such picture tubes may require modulation of the field deflection current for correcting a geometrical distortion defined as gullwing distortion, illustrated by the raster lines of FIG. 1. A cause of this distortion is the difference between the beam scanning radius of curvature and the tube faceplate radius of curvature as the electron beams scan a raster pattern.

In FIG. 1, a raster area R is schematically represented by a rectangular box that encompasses the viewing area of faceplate 30 of a square-planar picture tube SP of FIG. 2. Horizontal and vertical deflection circuits 20 and 40 of FIG. 2 generate horizontal and vertical deflection currents in horizontal and vertical deflection windings $L_H$ and $L_V$, respectively. The horizontal and vertical deflection currents produce a pattern of scanned raster lines on faceplate 30.

Assuming that horizontal and vertical deflection circuits 20 and 40 correct for distortions such as east-west, north-south and S-distortion, the display of a pattern of horizontal raster scan lines on faceplate 30 is illustrated in FIG. 1. The raster scan lines of FIG. 1 exhibit a residual distortion identified as gullwing distortion.

In gullwing distortion, the vertical deviation of the electron beams scanning a given raster line, such as line $L_{1+}$, undergoes approximately two cycles of oscillation about their straight, dashed-line position in FIG. 1. During the first half of the vertical trace interval, between time $T_{V1}$ and time $T_{V0}$, the vertical deviation of each raster line scan produces an upward excursion at intermediate points of a given line scan, near times $t_{H2}$ and $t_{H3}$ of the line trace interval, $T_{Ht}$. Maximum downward excursion of each raster line scan during the top half of vertical trace occurs at the beginning, center and end of each line scan, corresponding to times $t_{H1}$, $t_{H0}$ and $t_{H4}$, respectively.

Additionally, in gullwing distortion, the phase of the deviations of a given raster line switches by 180° when scanning from the top half of the raster to the bottom half of the raster. Thus the phase of the deviations of raster line $L_{1-}$, scanned at vertical instant $T_{V3}$, is inverted in phase relative to the excursions of the corresponding raster line $L_{1+}$, scanned at vertical instant $T_{V2}$.

When horizontal and vertical deflection circuits 20 and 40 are used in conjunction with raster scanning on faceplate 30 of square-planar picture tube SP of FIG. 2, the effects of gullwing distortion on raster R of FIG. 1 varies during the vertical trace interva $T_{Vt}$. Gullwing distortion is at a maximum for raster lines scanned at times intermediate the center of vertical trace and the beginning or end of vertical trace. Thus, maximum gullwing distortion or maximum deviation of a raster line occurs when scanning raster lines $L_{1+}$ and $L_{1-}$ during vertical scan instants $T_{V2}$ and $T_{V3}$.

Minimum or no gullwing distortion of the raster scan lines is associated with line scanning at the top, center and bottom of the raster, when scanning raster lines $L_{2+}$, $L_0$ and $L_{2-}$, during vertical scan instants $T_{V1}$, and $T_{V0}$ and $T_V$, respectively.

Another well-known form of raster distortion with which the present invention is concerned is pincushion distortion, and, particularly, the top and bottom aspect of such distortion. This type of distortion is characterized by a central bowing of the raster scanning lines, the character of the bowing varying from a maximum downward bowing at the raster top through a minimum near the raster middle to a maximum upward bowing at the raster bottom. The bowing is approximately hyperbolically or parabolically shaped. FIG. 3 illustrates the effect of top and bottom pincushion distortion, when left uncorrected, on the shape of horizontal stripes of a crosshatch pattern. This distortion results from the physical geometry of the deflection system as determined by such factors as the size and configuration of the target area and the relative position of an electron beam deflection center with respect to the target.

A well known solution to the top-bottom pincushion distortion problem is to modulate the vertical scanning current at the frequency $f_v$ with a horizontal rate $f_H$ correction current. Thus, during the scanning of a horizontal scan line at the top of the screen of the CRT, for example, the horizontal rate correction current causes a varying change in the vertical scanning current. The varying change is such that at the center of such horizontal line, the vertical scanning current is larger than at the edges. Thus, the center portion of such horizontal scan line is displayed further from the horizontal center of the screen of the CRT. Consequently, the bow-shaped horizontal scan line is modified to appear closer to a horizontal straight line.

In accordance with an aspect of the invention, gullwing distortion that tends to occur in conjunction with raster scanning of a faceplate picture tube is compensated by a gullwing correction circuit. The gullwing correction circuit is responsive to a first signal that repeats at a line or horizontal rate and to a second signal that repeats at a field or vertical rate for generating a third signal at a higher frequency than the line rate such as, for example, $2 \times f_H$, that is modulated at the field rate. A pincushion correction circuit that is responsive to the first and second signals generates a fourth signal that is amplitude modulated at the field rate and that is at a frequency that is, for example, at the line rate $f_H$. The third and fourth signals are combined to form a modulated, combined signal that is representative of both the third and fourth signals. The combined signal is transformer coupled to a second winding of a transformer. A modulating voltage that is developed in the second winding of the transformer is coupled to a field deflection circuit for modulating the field deflection current for correcting the gullwing and the north-south distortions.

The winding of the transformer forms an inductance that is coupled to a capacitor to form a resonant circuit that may be tuned to the horizontal frequency. The modulation voltage is developed between terminals of the winding. In resonance, the resonant circuit, advantageously, amplifies an amplitude of a pincushion distortion correction component voltage that is at the horizontal frequency and that is included in the modulation voltage. Consequently, the amplitude of the pincushion distortion correction voltage component of the modulating voltage becomes, advantageously, sufficiently large to provide the required pincushion distortion correction. A gullwing distortion correction voltage component that is at a frequency of, for example, $2xf_H$, is transformer coupled to the winding without the need to be amplified since its amplitude need not be as large as that of the pincushion distortion correction voltage component.

In accordance with an additional aspect of the invention, a television deflection apparatus with first and second raster distortions correction includes a first source of an input signal at a frequency that is related to a first deflection frequency and a second source of an input signal at a frequency that is related to a second deflection frequency. The signals that are produced by the first and second sources are used for generating, in accordance with the first raster distortion, a first raster distortion correction signal at a third frequency that is related to the first deflection frequency. The correction signal is modulated in accordance with the signal that is produced by the second source. The signals that are produced by the first and second sources are also used for generating, in accordance with the second raster distortion, a second raster distortion correction signal at a frequency that is related to the first deflection frequency. The second raster distortion correction signal is modulated in accordance with the signal that is produced by the second source. A deflection circuit output stage is responsive to the signal at the frequency that is related to the second deflection frequency. The deflection circuit includes a deflection winding for generating a deflection current in the deflection winding at the second deflection frequency. A first winding of a transformer is coupled to the deflection winding. The first and second raster distortion correction signals are applied substantially by a transformer action of the transformer to the first winding to generate, in the first winding in accordance with the first and second raster distortion correction signals a modulation voltage. The modulation voltage modulates the deflection current in a manner that provides correction of the first and second raster distortion such that a corresponding portion of the modulation voltage that is developed across a given winding turn of the first winding is representative of both the first and second raster distortion correction signals.

Figure 4:
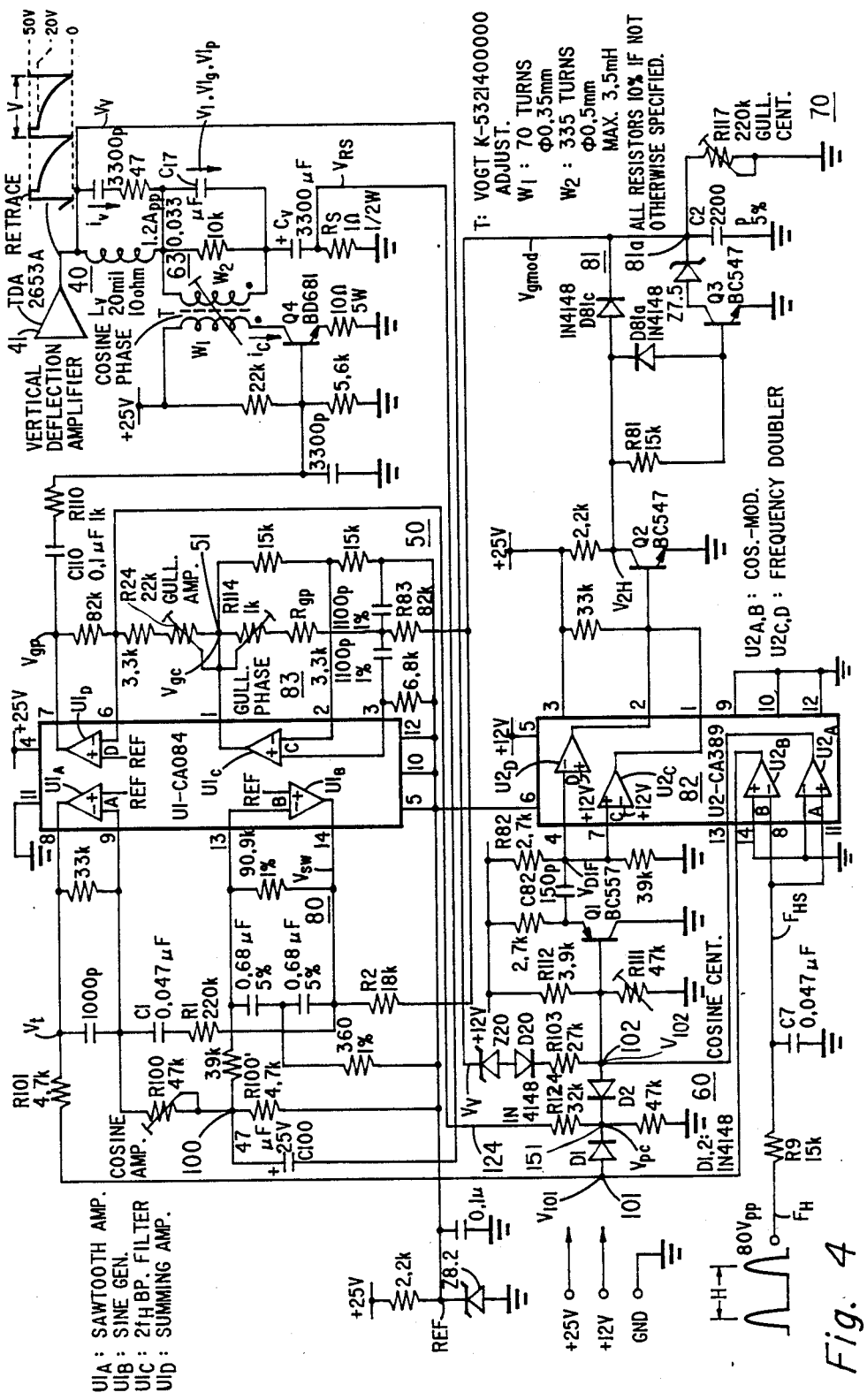
FIG. 4 illustrates a detailed embodiment of the vertical deflection circuit of FIG. 2, including circuitry, embodying the invention, that corrects gullwing distortion.

In a deflection circuitry illustrated in FIG. 4, a vertical deflection circuit output stage 40 includes a vertical deflection amplifier 41 that generates vertical deflection current $i_V$ in a vertical deflection winding $L_V$. A combined pincushion and gullwing distortion correction circuit 70, embodying the invention, modulates vertical deflection current $i_V$ by applying a gullwing modulation voltage component $V1_g$, of a gullwing and pincushion modulation voltage V1 that is developed across a capacitor $C_{17}$, to vertical deflection winding $L_V$. To provide north-south pincushion raster distortion correction, correction circuit 70 modulates vertical deflection current $i_V$ by applying to vertical deflection winding $L_V$ a north-south correction voltage component $V1_p$ of voltage V1. Vertical deflection current $i_V$ flows to ground via a coupling capacitor $C_V$ and a current sampling resistor $R_s$.

FIGS. 5a–5j and 6a–6j illustrate waveforms useful in explaining the operation of correction circuit 70 of FIG. 4. Similar numbers and symbols in FIGS. 4, 5a–5j and 6a–6j illustrate similar items or functions.

North-south pincushion correction of vertical deflection current $i_V$ of FIG. 4 is provided by a raster distortion correction circuit 70 that generates a north-south modulation voltage component $V1_p$ across capacitor $C_{17}$ that together with gullwing modulation voltage component $V1_g$ is applied to vertical deflection winding $L_V$. North-south modulation voltage component $V1_p$ is a line frequency, sinusoidal voltage, phased by circuit 63 to have a zero crossing near the center of the horizontal trace interval. The amplitude envelope of line frequency voltage component $V1_p$ is made to vary at a vertical rate in a generally sawtooth manner, having maximum envelope height near the top and bottom of the raster and zero height near the center. To generate modulation voltage component $V1_p$, raster distortion correction circuit 70 includes a pincushion modulation control circuit 60 that generates a north-south pincushion modulation voltage $V_{pc}$ at a terminal 151, as described below.

Figure 5:
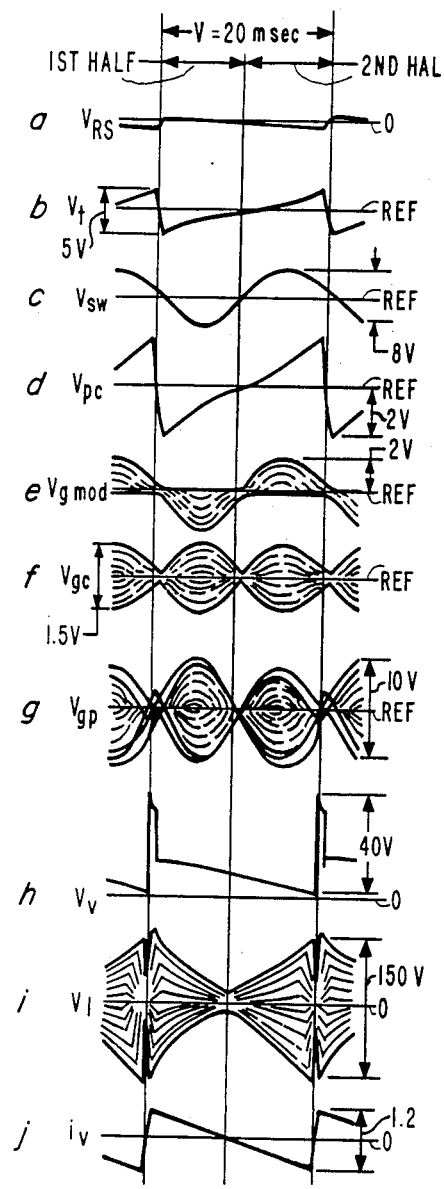
FIGS. 5a–5j illustrates waveforms at the vertical frequency that are useful for explaining the operation of the circuit of FIG. 4.

A sawtooth signal $V_{RS}$ of FIG. 5a that is developed across resistor $R_s$ of FIG. 4 is AC coupled via a capacitor C100 to a junction terminal 100 that is coupled to a cosine amplitude control resistor R100. Resistor R100, that is coupled to an inverting input terminal of an operational amplifier $U1_A$, forms with amplifier $U1_A$ an inverting amplifier that generates a vertical rate inverted sawtooth signal $V_t$ of FIG. 5b. The peak-to-peak amplitude of signal $V_t$ is adjustable by adjusting variable resistor R100 of FIG. 4 that controls the gain of the amplifier.

The noninverting input terminal of amplifier U1$_A$ is coupled to a DC reference voltage REF that is developed across a zener diode Z8.2. Sawtooth signal V$_{RS}$ is AC coupled and DC reference voltage REF is added via resistors R100′ and R100 to the inverting input terminal of amplifier U1$_A$. Therefore, signal V$_t$ that is developed at an output terminal of amplifier U1$_A$ is also a sawtooth signal having a portion that is more positive than voltage REF and a second, substantially symmetrical portion, that is less positive than reference voltage REF. In this way, sawtooth signal V$_t$ has an average value that is equal to voltage REF as shown in FIG. 5b. Signal V$_t$ of FIG. 4 is coupled to a junction terminal 101 modulator, or pincushion correction control circuit 60 through a resistor R101. Terminal 101 is coupled to an output terminal of a comparator U2$_B$. As described below, comparator U2$_B$, operating as a switch, is responsive to horizontal retrace pulses F$_H$.

Figure 2:
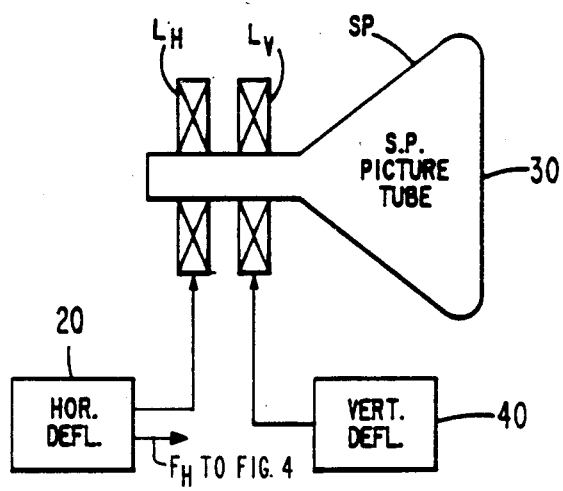
FIG. 2 illustrates in block diagram form raster scanning circuitry used in conjunction with raster scanning on the aspherical faceplate of a square-planar picture tube.
Figure 3:
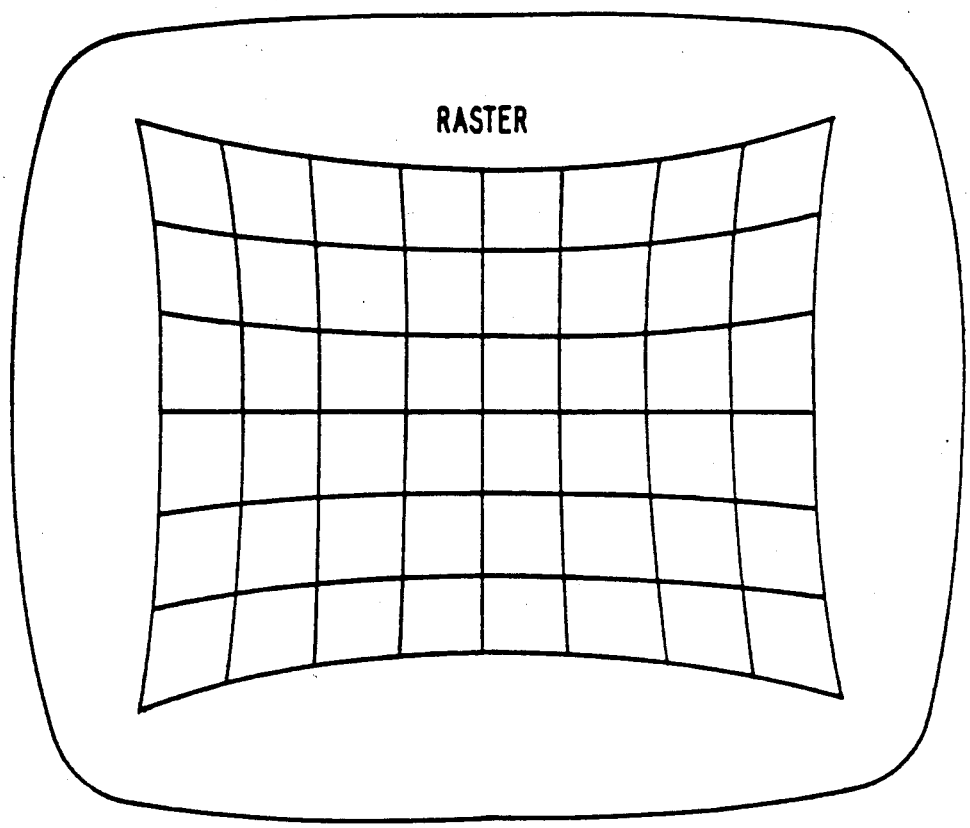
FIG. 3 illustrates pincushion distortion of a raster.
Figure 6:
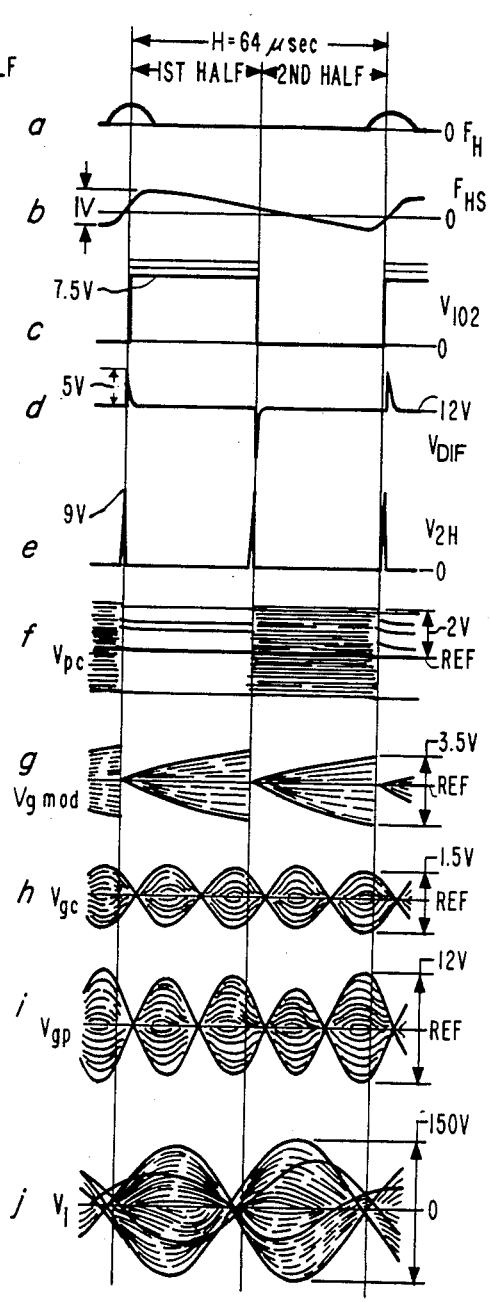
FIGS. 6a–6j illustrates waveforms at the horizontal frequency and at twice the horizontal frequency that are useful for explaining the operation of the circuit of FIG. 4.

Horizontal retrace pulses F$_H$ of FIG. 6a that are generated in, for example, a flyback transformer of a horizontal deflection circuit 20 of FIG. 2 are coupled to an integrating network that is formed by a resistor R9 and a capacitor C7 of FIG. 4. Similar numbers and symbols in FIGS. 2 and 4 indicate similar items or functions. Consequently, a sawtooth sign F$_{HS}$ of FIG. 6b at a horizontal rate f$_H$ is developed across capacitor C7 of FIG. 4 having an average value that is equal to zero volts. Signal F$_{HS}$ is coupled to an inverting input terminal of comparator U2$_B$ and to a noninverting input terminal of a comparator U2$_A$. The other corresponding input terminals of comparators U2$_A$ and U2$_B$ are at zero volts. Consequently, terminals 101 is grounded by the output terminal of comparator U2$_B$ that operates as a conductive switch, during a first half, and as a nonconductive switch during a second half of each horizontal period H of FIG. 6a.

During the second half of each horizontal period H, when comparator U2$_B$ of FIG. 4 operates as a nonconductive switch, signal V$_t$ is coupled through a diode D1 to terminal 151 to form, in each period H, a first portion of a north-south pincushion modulation signal V$_{pc}$ of FIG. 6f, that was mentioned before. During the first half of period H, terminal 101, that is grounded, is decoupled from terminal 151 by diode D1 that is back biased.

A fixed resistor R112 of FIG. 4 and a variable resistor R111 form a voltage divider that develops at terminal 102 a signal V$_{102}$ at a level that is adjustable. Terminal 102 is coupled to an output terminal of a comparator U2$_A$. Comparator U2$_A$, operating as a switch that is coupled between ground and terminal 102, causes terminal 102 to be at, approximately, ground potential during the second half of each horizontal period H of FIG. 6c. Consequently, terminal 102 is decoupled from terminal 151 by a diode D2 that is back biased. Thus, during the first half of each horizontal period H, that occurs during vertical trace, signal V$_{102}$ at terminal 102 that is close in value to that of reference voltage REF is coupled through diode D2 to terminal 151 to form a second portion of pincushion modulation signal V$_{pc}$, as shown in FIG. 6f. As described before, during the second half of each horizontal period H, signal V$_t$ is coupled to terminal 151 instead of signal V$_{102}$ to form the first portion of signal V$_{pc}$.

North-south pincushion modulation signal V$_{pc}$ of FIG. 4 is coupled via a resistor R124 to an inverting input terminal of an amplifier U1$_D$. Amplifier U1$_D$, that is coupled in a configuration of a linear inverting amplifier, generates an output signal V$_{gp}$ having a corresponding signal component that is linearly proportional to signal V$_{pc}$.

Sign V$_{gp}$ is AC coupled to the base of a power transistor Q4 that operates in the class A mode. Transistor Q4 is coupled to the primary winding W$_1$ of a transformer T. The secondary winding W$_2$ of transformer T is coupled in series with vertical deflection winding L$_V$. Secondary winding W$_2$ of transformer T and capacitor C$_{17}$ form an LC resonant circuit 63 that is tuned to the line frequency f$_H$.

In response to line rate, square-wave voltage of signal V$_{pc}$, power transistor Q4 generates a collector current i$_c$ that excites resonant circuit 63 into oscillation at the line rate to generate north-south modulation voltage component V1$_p$ having a sinewave waveform at the frequency f$_H$ that is applied to vertical deflection winding L$_V$. The amplitude envelope variation at the vertical rate of voltage component V1$_p$ is accomplished in accordance with the vertical rate of the amplitude of signal V$_{pc}$. Phase variation of voltage component V1$_p$ is adjustable by varying the inductance of winding W$_2$.

Sinewave, north-south modulation voltage component V1$_p$, when applied to vertical deflection winding L$_V$, generates a cosine north-south correction modulation current component in field deflection current i$_V$ that is phase shifted by 90° from voltage V1$_p$. Thus, with respect to line scanning instants t$_{H1}$ through t$_{H4}$ of FIG. 1, the north-south correction current component of vertical deflection current i$_V$ reaches maximum magnitude at the center of horizontal trace at time t$_{H0}$.

During the first half of each horizontal period H of FIG. 6f, that occurs during vertical trace, signal V$_{pc}$ is substantially equal to voltage REF, as described before. During the second half of those horizontal periods H that occur during the first half of vertical trace, the level of signal V$_{pc}$ is less positive than its level in the first half of such period H; whereas, during the second half of those horizontal periods H that occur during the second half of vertical trace, the level of signal V$_{pc}$ is more positive then its level in the first half of such period H. Thus, the horizontal rate phase of signal V$_{pc}$ reverses by 180° at a corresponding crossover point that occurs when signal V$_t$ of FIG. 5b becomes equal to voltage REF. A second such crossover point occurs during vertical retrace. Adjusting resistor R111 that varies signal V$_{102}$ varies the time within vertical trace when the first crossover point occurs. In this way, adjusting resistor R111, advantageously, provides north-south pincushion or cosine centering.

The horizontal rate peak-to-peak amplitude of signal V$_{pc}$ of FIG. 4 in a given period H is equal to the difference between the level of signal V$_{pc}$ of FIG. 6f that occurs during the first half of the given horizontal period H that, as described before, is approximately equal to constant voltage REF, and its level during the second half of such horizontal period H. During the second half, the level of signal V$_{pc}$ is proportional to signal V$_t$ of FIG. 5b. As described before, signal V$_t$ is a sawtooth signal having an average value that is approximately equal to voltage REF. It follows that the vertical rate envelope of the peak-to-peak magnitude of signal V$_{pc}$ of FIG. 5d decreases gradually in a vertical rate ramping manner from the beginning of vertical trace toward its center where the first phase crossover point occurs. Similarly, it increases gradually in the vertical rate ramping manner from the center of vertical trace toward the end of vertical trace.

North-South modulation voltage component $V1_p$ changes by 180° approximately at the center of the raster. The time when the phase reversal occurs is controlled by adjusting resistor R111, as described before. Also, the phase has to change back again by 180° immediately prior to the beginning of the following vertical scanning. Hence, it has to change by 180° during, for example, vertical retrace.

The response of voltage component $V1_p$ to the abrupt change by 180° of the phase of voltage $V_{pc}$ that occurs during vertical retrace may not be sufficiently fast. Because the amplitude of voltage component $V1_p$ is at its maximum prior to vertical retrace, a slow response to such change in phase, if not speeded-up, disadvantageously, might introduce raster distortions at the top of the raster. Therefore, it may be desirable to advance the time when such phase reversal begins, to allow a longer response time for reversing such phase during vertical retrace. During vertical retrace the phase reversal in voltage component $V1_p$ begins to occur when downramping signal $V_t$ of FIG 5b becomes equal to the voltage at terminal 102.

In accordance with an aspect of the invention, a series arrangement of a zener diode 20, a diode D20 and a resistor R103 is coupled between terminal 102 and an output terminal of vertical deflection amplifier 41 where a vertical rate signal $V_v$ of FIG. 5h is developed. A portion of a corresponding retrace pulse of signal $V_v$ that causes zener diode Z20 to conduct is coupled to terminal 102 that makes the voltage at terminal 102 more positive during vertical retrace than during vertical trace. It follows that signal $V_t$ of FIG. 5b becomes equal to the voltage at terminal 102 earlier within vertical retrace than if the vertical retrace pulse of signal $V_v$ were not coupled to terminal 102. It follows that the time, during vertical retrace, when the phase reversal, or the second crossover point occurs in both sign $V_{pc}$ of FIG. 4 and in voltage component $V1_p$ across capacitor C17 is, advantageously, advanced. Thus, the phase reversal is, advantageously, speeded-up.

Figure 1:
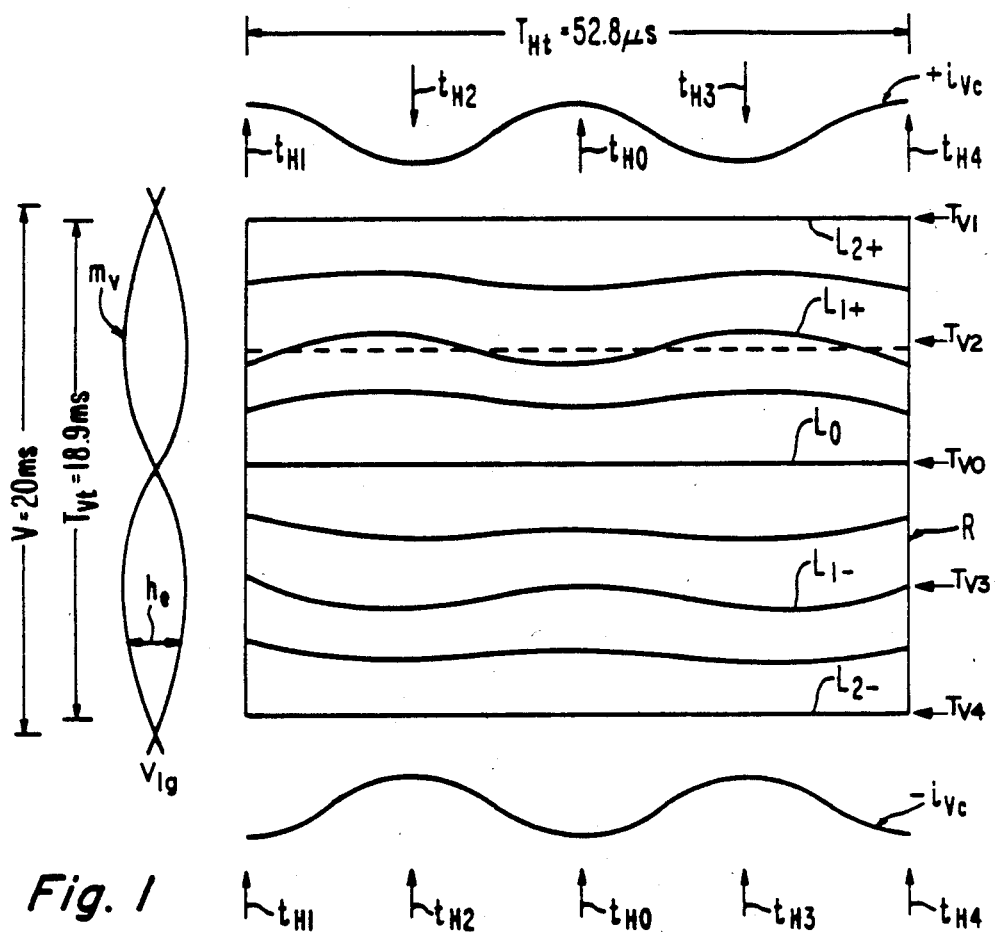
FIG. 1 illustrates the raster pattern of gullwing distortion appearing on the aspherical faceplate of a square-planar picture tube.

To correct gullwing raster distortion, gullwing correction circuit 70 modulates vertical deflection current $i_v$, during each line deflection period within the field deflection trace interval in the manner illustrated by the current $i_{vc}$, illustrated in FIG. 1 by the two current waveforms $+i_{vc}$. Current $i_{vc}$ represents a line repetitive modulation component of the vertical deflection current wherein approximately two cycles of oscillation of modulation current $i_{vc}$ is developed during the line trace interval $T_{Ht}$.

To correct gullwing distortion of the raster lines, the modulation current component $i_{vc}$ is 180° out-of-phase with the oscillatory vertical deviations of the corresponding raster lines. Thus, for the lines scanned in the top half of the raster, such as raster line $L_{1+}$, modulation current component $+i_{vc}$ reaches its negative minima AC-wise near the line trace instants $t_{H2}$ and $t_{H3}$, and reaches its positive maxima near times $t_{H1}$, $t_{H0}$ and $t_{H4}$. For lines scanned in the bottom half of raster R, the modulation current component is the phase inverted current $-i_{vc}$, reaching maxima near times $t_{H2}$ and $t_{H3}$ and minima near times $t_{H1}$, $t_{H0}$ and $t_{H4}$.

In addition, to provide gullwing distortion correction of a raster displayed on the aspherical faceplate of a square-planar picture tube, the amplitude envelope $m_V$ of modulation current component $i_{vc}$ is varied in envelope height during the vertical trace interval $T_{Vt}$ in the manner illustrated in FIG. 1. The height of the modulation envelope undergoes approximately two cycles of oscillation, achieving maximum height near times $T_{V2}$ and $T_{V3}$, corresponding to the scanning of raster lines $L_{1+}$ and $L_{1-}$. The modulation envelope reaches zero or near zero height near the center of vertical trace, time $T_{V0}$, when scanning raster line $L_0$ and near the top and bottom of the raster, near times $T_{V1}$ and $T_{V4}$, when scanning raster lines $L_{2+}$ and $L_{2-}$. Other modulation envelopes may be generated to correct gullwing distortion for television systems that require different envelop vertical variations.

To generate modulation current component $i_{vc}$, having a modulation envelope $m_V$, distortion correction circuit 70 includes a gullwing modulation control circuit 50 that generates at a terminal 51 a gullwing modulation signal $V_{gc}$ at a terminal 51. Gullwing modulation control circuit 50 includes a sinewave generator 80 that generates a sinewave signal $V_{SW}$ at an output termianl of an amplifier U1$_B$ having a sinewave waveform that is shown in FIG. 5c.

The sawtooth waveform of signal $V_{RS}$ that is developed across resistor $R_S$ is AC coupled to terminal 100 of generator 80. Generator 80 forms sinewave signal $V_{SW}$ by double integrating sawtooth signal $V_{RS}$. Sinewave signal $V_{SW}$ is coupled via a resistor R1 and a capacitor C1 to the inverting input terminal of amplifier U1$_A$.

In accordance with a feature of the invention, signal $V_{SW}$ is added in amplifier U1$_A$ to the vertical sawtooth that, as described before, is coupled to terminal 100, thus, advantageously, providing "anti-S" correction. Consequently, as shown in FIG. 5b, the trace portion of signal $V_t$ is not a straight line; rather, it includes a sinewave voltage component.

Horizontal rate signal $V_{102}$ of FIG. 6c having approximately 50% duty cycle is coupled via a transistor Q1 of FIG. 4 operating as an emitter follower to a differentiation network that includes a capacitor C82 and a resistor R82. The differentiation network produces a signal $V_{DIF}$ having a positive going narrow pulse when a positive going transition occurs in signal $V_{102}$ and a negative going narrow pulse when a negative going transition occurs in signal $V_{102}$. Signal $V_{DIF}$ of FIG. 6d is coupled via a comparator U2$_C$ of FIG. 4 and a comparator U2$_D$, having corresponding output terminals that are coupled, to the base electrode of a transistor Q2.

In carrying out a yet further aspect of the invention, comparators U2$_C$ and U2$_D$ operate as a frequency doubler to produce a signal $V_{2H}$ of FIG. 6e at the frequency $2 \times f_H$ that is used for gullwing distortion correction and that is developed at the collector electrode of transistor Q2 of FIG. 4. Signal $V_{2H}$ of FIG. 6e contains a positive narrow pulse when each signal transition occurs in signal $V_{102}$ of FIG. 6c. The narrow pulses of signal $V_{2H}$ that occur at the frequency $2 \times f_H$ are coupled to a gullwing modulator 81.

A resistor R2 of gullwing modulator 81, embodying an additional aspect of the invention, has a terminal that is driven by sinewave signal $V_{SW}$, that was described before, and a second terminal, a terminal 81a, that is coupled to a plate of an integrating capacitor C2. The other plate of capacitor C2 is grounded. Consequently, during each one-half of period H, capacitor C2 is charged in an upramping manner when sinewave signal $V_{SW}$ is more positive than voltage REF and in a downramping manner when it is less positive than voltage REF to develop at terminal 81a a first portion of a sawtooth signal $V_{gmod}$.

A switching transistor Q3 has an emitter that is grounded and a collector that is coupled through a zener diode Z7.5 to terminal 81a. The base of transistor Q3 is coupled through a resistor R81 to signal $V_{2H}$. Transistor Q3 and diode Z7.5 clamp or establish signal $V_{gmod}$ at terminal 81a of capacitor C2 to be approximately at the same level as reference voltage REF each time the corresponding narrow pulse of signal $V_{2H}$ of FIG. 6e occurs. Consequently, a second portion of sawtooth signal $V_{gmod}$ is formed that changes in the opposite direction to that of the first portion. For example, when sinewave signal $V_{SW}$ of FIG. 5c is less positive than voltage REF, the positive pulse of signal $V_{2H}$ of FIG. 6e is coupled through a diode D81c of FIG. 4 to terminal 81a to charge capacitor C2 to the clamping level that is approximately equal to voltage REF and that is established by zener diode Z7.5.

During the corresponding portion of each half of period H, when the corresponding positive pulse of signal $V_{2H}$ does not occur, signal $V_{gmod}$ at terminal 81a is upramping if sinewave signal $V_{SW}$ is then positive relative to voltage REF, and is downramping signal if signal $V_{SW}$ is then negative relative to voltage REF. The magnitude or peak of signal $V_{gmod}$ of FIG. 6g that occurs immediately prior to the occurrence of the clamping operation of transistor Q3 of FIG. 4 during each half of period H of FIG. 6g is determined by the level of vertical rate sinewave signal $V_{SW}$ of FIG. 5c at that time. When the polarity of signal $V_{SW}$ of FIG. 4 reverses, the phase of signal $V_{gmod}$ also reverses by 180°. Consequently, sawtooth signal $V_{god}$ that occurs at twice the horizontal rate is amplitude modulated in accordance with the current value of signal $V_{SW}$. Phase reversal in signal $V_{gmod}$ occurs approximately at the center of vertical trace.

Modulated signal $V_{gmod}$ is coupled through a resistor R83 to an active bandpass filter 83 having a center passing frequency at $2 \times f_H$ that, in, for example, the PAL standard, is 31.25 KHZ. Filter 83 produces, from signal $V_{gmod}$, gullwing correction signal $V_{gc}$ at terminal 51. In signal $V_{gc}$, vertical rate and quadruple horizontal rate signal components and their respective harmonics are, advantageously, substantially removed or highly attenuated. Fine adjustment of the phase of signal $V_{gc}$ relative to horizontal deflection current in deflection winding $L_H$ of FIG. 2 is accomplished by varying a resistor R114 of bandpass filter 83 of FIG. 4.

In accordance with an aspect of the invention, gullwing modulation signal $V_{gc}$ is coupled to the inverting input terminal of amplifier U1$_D$ where it is summed with north-south pincushion modulation signal $V_{pc}$ to develop, at the output terminal of amplifier U1$_D$, signal $V_{gp}$ that contains the sum of both and that provides both gullwing and pincushion distortion correction. As described before, signal $V_{gp}$ is coupled to the base of transistor Q4. Because transistor Q4 operates as a linear amplifier, the corresponding collector current component $i_c$ of transistor Q4 that is at the frequency $2 \times f_H$ and that is coupled to winding W$_1$ is, advantageously, amplified undistorted.

Gullwing modulation voltage component $V1_g$ is developed across winding W$_2$ of transformer T by a transformer action, as a result of the corresponding current component of collector current $i_c$ in transistor Q4 that is modulated by signal $V_{gc}$ at terminal 51. Gullwing correction voltage component $V1_g$ that is applied to vertical deflection winding $L_V$ modulates vertical deflection current $i_V$. The vertical rate amplitude modulation of voltage component $V1_g$ enables distortion correction circuit 70 to produce a vertical rate modulation envelope of the gullwing correction current $i_{Vc}$ of FIG. 1.

In carrying out another aspect of the invention, voltage component $V1_g$ that provides gullwing distortion correction, and voltage component $V1_p$ that provides pincushion distortion correction, are formed by the transformer action of transformer T. Each of voltage components $V1_g$ and $V1_p$ includes a corresponding portion that is developed across each winding turn of the same winding such as, for example, winding W$_2$ of transformer T. Thus, advantageously, only one transformer such as, for example, transformer T is required for generating both voltage components $V1_g$ and $V1_p$ and that form the combined modulation voltage V1 that is coupled to deflection winding $L_V$.

Modulator 81 of FIG. 4 functions as a suppressed carrier modulator. Therefore, the phase of gullwing correction voltage component $V1_g$ switches 180° near the center of vertical trace at an instance that is controlled by adjusting resistor R117 that is coupled to terminal 81a. This phase change enables correction circuit 70 to change the phase of gullwing correction current $i_{Vc}$ at the center of vertical trace, from $+i_{Vc}$ to $-i_{Vc}$, as is required for proper gullwing distortion correction.

Signal $V_{pc}$ that provides pincushion distortion correction contains, advantageously, substantially no signal components at the frequency $2 \times f_H$, or at other even harmonics, that may adversely affect gullwing distortion correction because it is substantially a square-wave waveform having a 50% duty cycle. Advantageously, gullwing modulating signal $V_{gc}$ contains substantially no signal components at the horizontal frequency $f_H$ because signal $V_{102}$, that is coupled to frequency doubler 82, has a 50% duty cycle. Because signals $V_{gc}$ and $V_{pc}$ are coupled to winding W$_2$ through linear stages, advantageously, no cross modulation occurs that could, adversely, affect raster distortion correction.

The signal component at the frequency $f_H$, but not that at the frequency $2 \times f_H$, of signal $V_{gp}$ that is developed at the output terminal of amplifier U1$_D$ is, advantageously, amplified by the resonance action of circuit 63 that forms a high impedance at the collector of transistor Q4 at the frequency $f_H$. The signal component at the frequency $2 \times f_H$ need not be amplified, since only a small gullwing signal amplitude is required for gullwing distortion correction. Additionally, because circuit 63 is tuned to the frequency $f_H$ that is substantially lower than that of voltage component $V1_g$, the phase of voltage component $V1_g$ is, advantageously, unaffected by adjusting the inductance of winding W$_2$. As indicated before, the phase of voltage component is adjusted by varying the inductance of winding W$_2$ to provide properly phased pincushion distortion correction.

As a result of the double integration operation of sinewave generator 80, sinewave signal $V_{SW}$ of FIG. 5c causes the peak-to-peak amplitude of gullwing modulation signal $V_{gc}$ of FIG. 5f to be at a corresponding maximum when the gullwing distortion in the aspherical faceplate picture tube 30 of FIG. 2 is at a maximum. Thus, signal $V_{gc}$ and voltage component $V1_g$ of FIG. 1 are, advantageously, at a corresponding maximum when vertical scanning occurs at approximately one-third down from the top edge of the raster and also when it occurs one third up from the bottom edge of the raster. Signal $V_{gc}$ of FIG. 5f and voltage component $V1_g$ of FIG. 1 have advantageously, minimum peak-to-peak amplitude during vertical scanning of each of the top, bottom and center of the raster where no gullwing correction is required.

What is claimed:

1. A television deflection apparatus with first and second raster distortions correction, comprising:
   a first source of an input signal at a frequency that is related to a first deflection frequency;
   a second source of an input signal at a frequency that is related to a second deflection frequency;
   means responsive to said signals that are produced by said first and second sources for generating, in accordance with said first raster distortion, a first raster distortion correction signal at a third frequency that is related to said first deflection frequency that is modulated in accordance with said signal that is produced by said second source;
   means responsive to said signals that are produced by said first and second sources for generating, in accordance with said second raster distortion, a second raster distortion correction signal at a frequency that is related to said first deflection frequency that is modulated in accordance with said signal that is produced by said second source;
   a deflection circuit output stage responsive to said signal at said frequency that is related to said second deflection frequency that includes a deflection winding for generating a deflection current in said deflection winding at said second deflection frequency;
   a first winding of a transformer coupled to said deflection winding; and
   means responsive to said first and second raster distortion correction signals for applying each substantially by means of a transformer action of said transformer to said first winding to generate in said first winding, in accordance with said first and second raster distortion correction signals, a modulation voltage that modulates said deflection current in a manner that provides correction of said first and second raster distortion such that a given winding turn of said first winding develops a voltage thereacross that is representative of both said first and second raster distortion correction signals.

2. An apparatus according to claim 1 wherein said first raster distortion correction is a gullwing distortion correction, said first raster distortion correction signal is a gullwing distortion correction signal, said second raster distortion correction is a north-south pincushion distortion correction and said second raster distortion correction signal is a north-south pincushion distortion correction signal.

3. An apparatus according to claim 2, further comprising, a capacitance coupled to said first winding to form a resonant circuit that is tuned to a horizontal deflection frequency for amplifying by a resonance action of said resonant circuit an amplitude of a voltage component of said modulation voltage that provides said north-south pincushion distortion correction.

4. An apparatus according to claim 3 wherein said first winding and said capacitance are coupled in parallel to form said resonant circuit.

5. An apparatus according to claim 3 wherein a voltage component of said modulation voltage that provides gullwing distortion correction is at a higher harmonic of said horizontal frequency and has an amplitude that is modulated in a vertical rate.

6. An apparatus according to claim 2 further comprising, a summing amplifier responsive to said correction signals for generating a sum signal thereof that is coupled to a second winding of said transformer.

7. An apparatus according to claim 6 further comprising, a transistor having a control electrode that is coupled to said sum signal and a main current conducting electrode that is coupled to said second winding of said transformer to generate in said second winding a first current component at a horizontal frequency that corresponds with said pincushion distortion correction signal and a second current component at a higher harmonic of said horizontal frequency that corresponds with said gullwing distortion correction signal.

8. An apparatus according to claim 7 further comprising, a capacitance coupled to said first winding to form a resonant circuit that is tuned to said horizontal frequency such that a ratio between an amplitude of a voltage component of said modulation voltage that correspond with said pincushion distortion correction signal and that of said first current component is, as a result of said resonant circuit being in resonance, substantially higher than a corresponding ratio between an amplitude of a voltage component of said modulation voltage that corresponds with said gullwing distortion correction signal and that of said second current component.

9. An apparatus according to claim 2 wherein said deflection circuit output stage generates said deflection current at a vertical rate.

10. An apparatus according to claim 9 wherein said gullwing distortion correction signal generating means comprises a sinewave generator responsive to said deflection current for generating a sinewave signal at a frequency that is related to said vertical rate, a frequency doubler responsive to said input signal at said frequency that is related to said horizontal frequency for generating a signal at a harmonic of said horizontal frequency and a modulator responsive to said sinewave signal and to said signal at said harmonic for generating said gullwing distortion correction signal by amplitude modulating said harmonic signal in accordance with said sinewave signal.

11. An apparatus according to claim 10 wherein said frequency doubler comprises, means responsive to a signal at said horizontal frequency for generating a square-wave signal at said horizontal frequency having approximately a 50% duty cycle and means responsive to said square-wave signal for generating an output pulse of said signal at said harmonic when each transition edge occurs in said square-wave signal.

12. An apparatus according to claim 11 wherein said modulator comprises a capacitance coupled to said sinewave signal for generating a second sawtooth signal in said capacitance at double the horizontal frequency having a portion signal that ramps in a first direction at a rate that is determined by said sinewave signal, said modulator being responsive to said output pulse of said harmonic signal that causes said second sawtooth signal to ramp in an opposite direction when said pulse of said harmonic signal that is generated by said frequency doubler occurs.

13. An apparatus according to claim 12 wherein said modulator further comprises, level clamping means responsive to said pulse of said frequency doubler for clamping a level of said second sawtooth signal to be at a predetermined level prior to a beginning time of said portion of said sawtooth signal that ramps in said first direction and adjustable means for adjusting said predetermined level of said sawtooth signal to provide gullwing distortion correction centering.

14. An apparatus according to claim 10 further comprising, a bandpass filter coupled to said modulator having a bandpass frequency range that is centered around a frequency that is equal to twice the horizontal frequency for filtering out component signals outside said bandpass frequency range from said gullwing distortion correction signal and means coupled to said modulator for adjusting a phase of said gullwing distortion correction signal relative to that of said input signal that is at said horizontal frequency.

15. An apparatus according to claim 10 wherein said sinewave generator is responsive to a sawtooth signal that is proportional to said deflection current and that is developed in said output stage to generate said sinewave signal by double integrating said sawtooth signal.

16. An apparatus according to claim 10 further comprising means responsive to said deflection current for generating a sawtooth signal that is coupled to said modulator to provide anti-S distortion correction.

17. An apparatus according to claim 9 wherein said pincushion distortion correction signal generating means comprises means responsive to said input signal at said frequency that is related to said horizontal frequency for generating a square-wave signal having about 50% duty cycle at said horizontal frequency, and a modulator responsive to a sawtooth signal at said vertical rate that is generated in said output stage and to said square-wave signal for generating said pincushion distortion correction signal by amplitude modulating said square-wave signal in accordance with said sawtooth signal.

18. An apparatus according to claim 17 wherein said modulator of said pincushion distortion correction signal generating means comprises first switching means responsive to said square-wave signal at said horizontal frequency for generating, during a first portion of a given horizontal period, a corresponding portion of a square-wave first signal at a level that is determined by a level of said sawtooth signal and, during a second portion of said given horizontal period, a corresponding portion of said first signal at a level that, during each vertical trace interval of said deflection current, is substantially constant.

19. An apparatus according to claim 18 further comprising, means coupled to said output stage for generating a signal that is representative of a vertical retrace pulse in said output stage, said retrace pulse representative signal being coupled to said first switching means to control said level of said first signal during said second portion of said given horizontal period that advances, during said vertical retrace, a time when phase reversal occurs in a component current of said deflection current that provides pincushion distortion correction.

20. An apparatus according to claim 2 further comprising combining means for combining said gullwing and pincushion distortion correction signals to generate a combined signal that is coupled to said first winding such that a signal path that is formed between each of said gullwing and pincushion distortion correction signals and said first winding is linear that prevents said modulation voltage from being distorted in said signal path 21. An apparatus according to claim 1 further comprising a square-planar picture tube such that said deflection winding provides vertical deflection thereto.

22. A television deflection apparatus that corrects first and second raster distortions, comprising:
  a deflection winding;
  means for generating a deflection current in said deflection winding;
  first and second windings of a transformer, said second winding being magnetically coupled to said first winding, and said second winding being coupled to said deflection winding;
  a signal generating circuit for generating a correction signal having a first signal component at a frequency that is related to a deflection frequency in accordance with said first raster distortion and a second signal component at a frequency that is related to said deflection frequency in accordance with said second raster distortion, said correction signal being applied to said first winding and being magnetically coupled from said first to said second winding for developing a corresponding correction signal in said second winding that modulates said deflection current in a manner that corrects said first and second raster distortions.

23. An apparatus according to claim 22 wherein said first signal component provides gullwing distortion correction and said second signal component provides north-south pincushion distortion correction.

24. An apparatus according to claim 22 further comprising, a capacitance coupled to said second winding to form with said second winding a resonant circuit that amplifies a signal component in said second winding, that corresponds with said second raster distortion correction signal, relative to a signal component in said second winding that corresponds with said first raster distortion correction signal.

* * * * *